Jan. 17, 1967   J. H. HOLAN ETAL   3,298,540
EXTENSIBLE BOOM WITH LOAD COMPENSATING MEANS
Filed Aug. 7, 1964   7 Sheets-Sheet 7

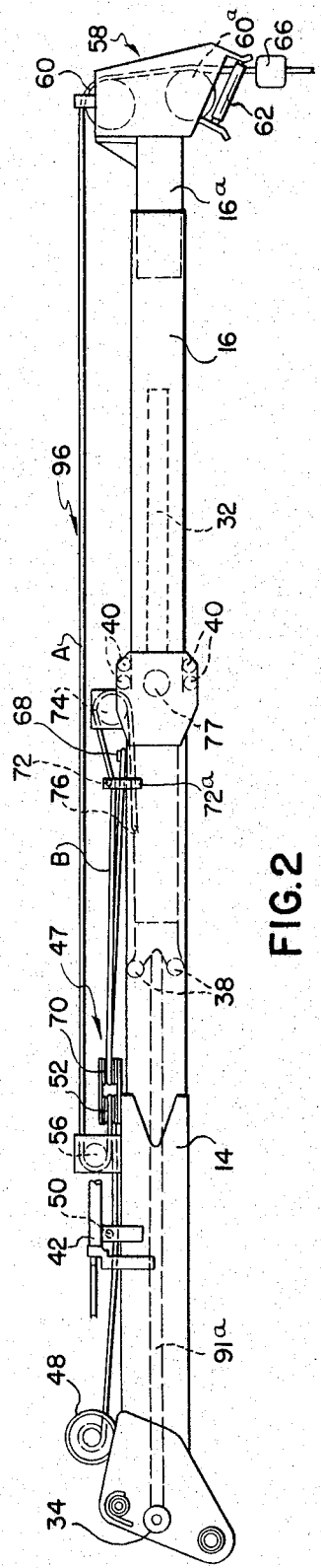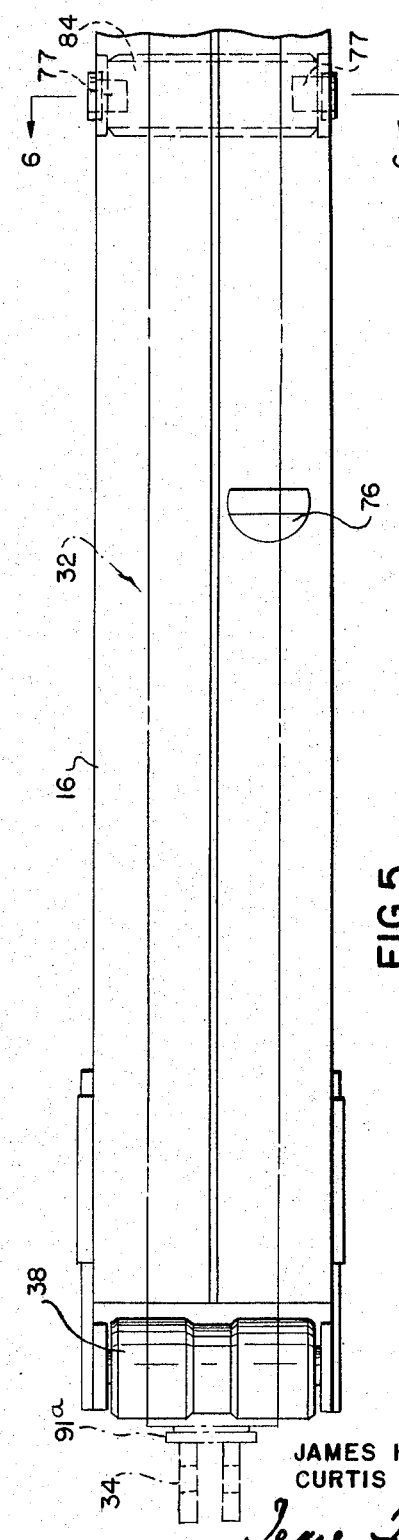

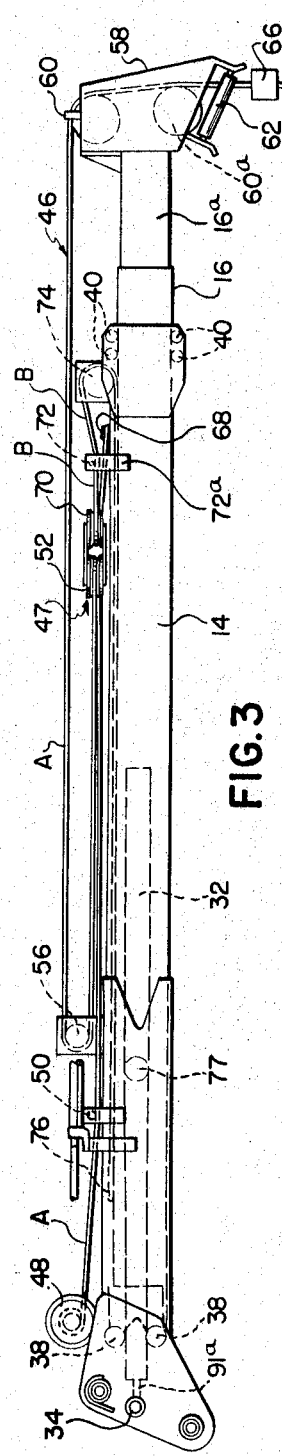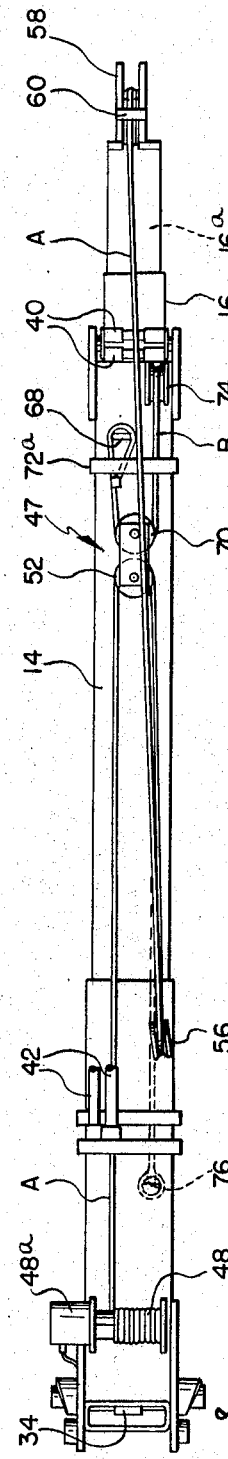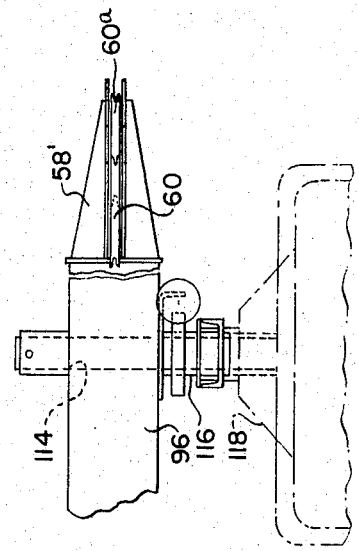

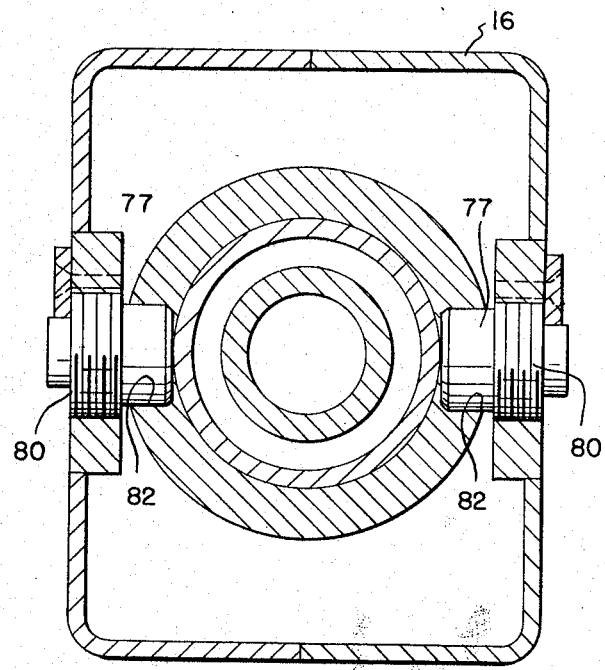
FIG. 6
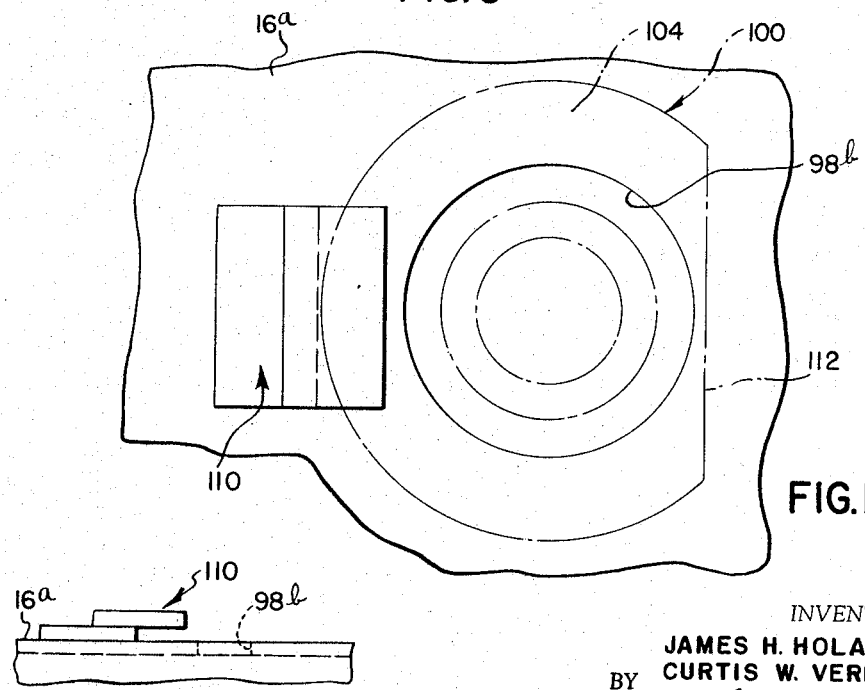
FIG. 15
FIG. 16

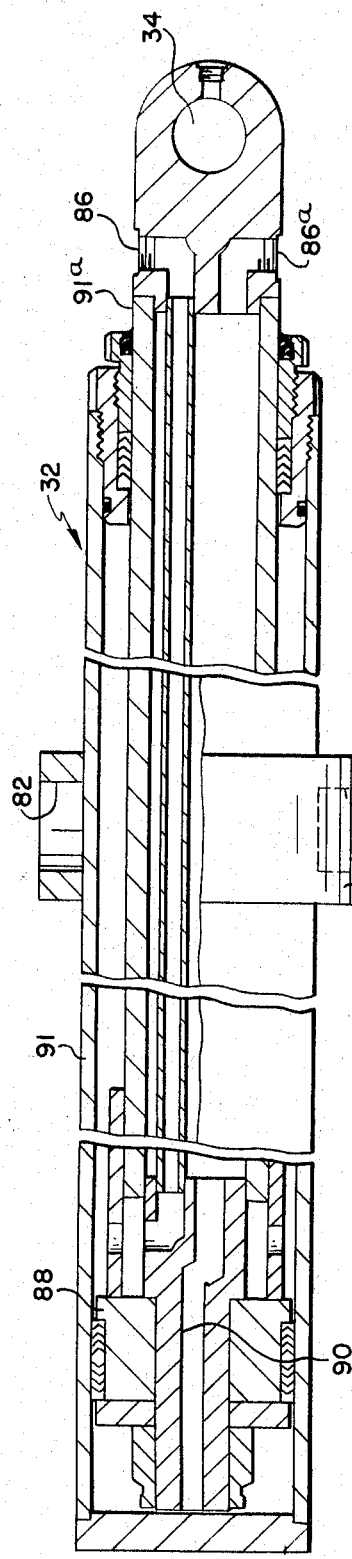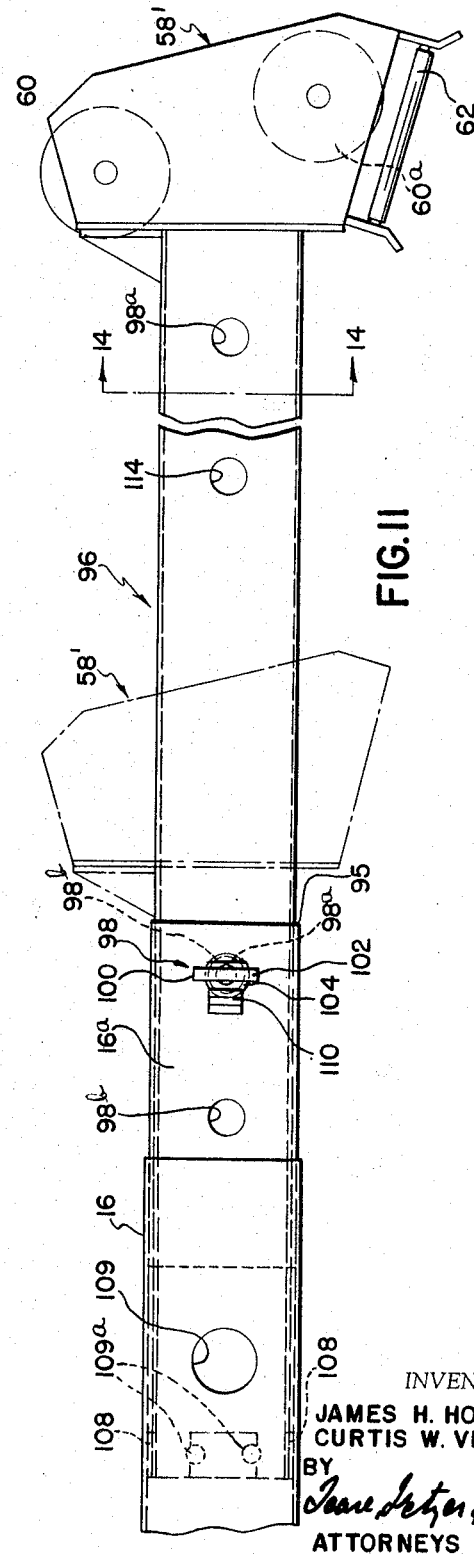

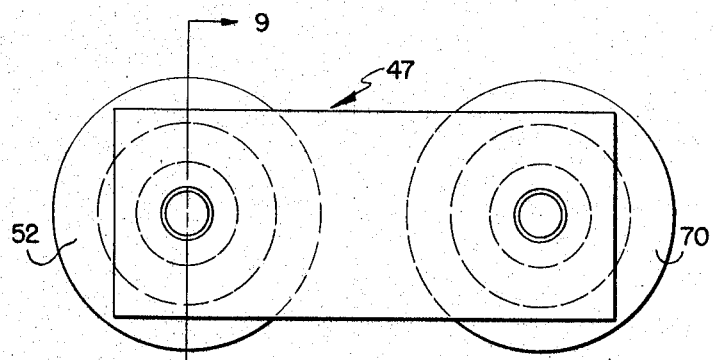
FIG.8
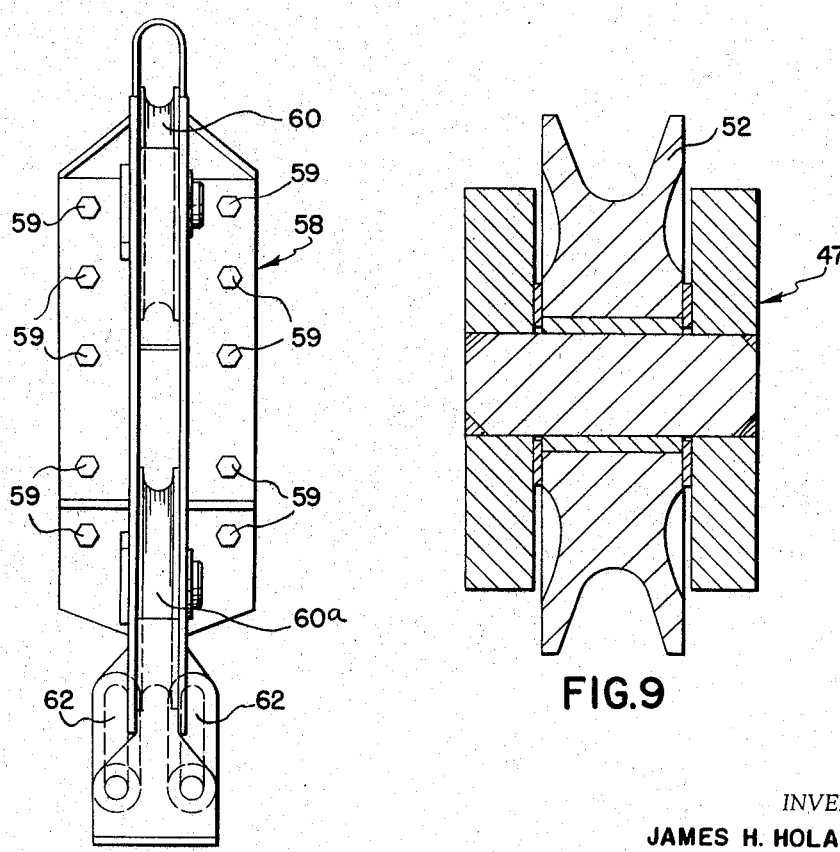
FIG.10
FIG.9

INVENTORS
JAMES H. HOLAN
BY CURTIS W. VERRELL

Seare, Fetzer & Seare
ATTORNEYS

United States Patent Office 3,298,540
Patented Jan. 17, 1967

3,298,540
EXTENSIBLE BOOM WITH LOAD COMPENSATING MEANS
James H. Holan, Rocky River, and Curtis W. Verrell, Fairview Park, Ohio, assignors to The Ohio Brass Company, Mansfield, Ohio, a corporation of Ohio
Filed Aug. 7, 1964, Ser. No. 388,217
11 Claims. (Cl. 212—55)

This invention relates in general to derricks or cranes, and more particularly to a derrick or crane wherein the boom thereof may be selectively extended and retracted, for adjusting the operating range or "reach" of the derrick.

The derrick or like apparatus of the invention is illustrated as being of a portable type, mounted on a utility type vehicle and having a load carrying cable system associated therewith, adapted for handling and/or erecting various objects, such as telephone or telegraph poles. Such load carrying cable system generally runs from a power operated winch on the vehicle, and then over the outer end of the extensible boom, and terminates at the load. It is usually necessary to manipulate two control levers when extending or retracting the boom while attempting to maintain a load suspended from the cable substantially stationary. One control lever generally controls the winch which retracts and pays out the cable, and another control lever controls the extension and retraction of the boom. If the load is snubbed or held by the cable system up against the derrick head and it is desired to extend the boom and still maintain the load in snubbed condition, the control of the boom extension and the control of the winch so as to keep from damaging or tearing the cable is rather difficult and requires a high degree of skill on the part of the operator.

The present invention provides an automatic compensating means for maintaining the load at a selected level with respect to the boom, while the boom is being contracted or extended, and eliminates the necessity of actuating the controls for both the winch mechanism and the extension of the boom, thus requiring the operator to merely actuate the control or lever for controlling the extension or retraction of the boom. This insures that no damage to the boom or the load carrying cable system will occur, especially if the load is snubbed up against the head of the boom as aforediscussed, and results in a materially easier controlled boom, and a substantial saving in time.

Accordingly, an object of the invention is to provide a novel arrangement of derrick or crane having an extensible type boom incorporating a load carrying cable system.

Another object of the invention is to provide a novel derrick or crane having an extensible type boom with a load carrying cable associated therewith for supporting a load, and automatic compensating means for maintaining the load at a selected level while the boom is being extended or retracted.

Another object of the invention is to provide a portable type derrick or crane including a sectional, extensible boom for selectively varying the effective length of the boom, and wherein cable means coacts with the boom for supporting a load thereon, and including means for controlling the paying out and retraction of the cable means and separate means for controlling the extension and retraction of the boom, and wherein there is provided automatic compensating means for automatically maintaining a load supported by the cable means at a given level with respect to the boom while the boom is being retracted or extended.

Other objects and advantages of the invention will be apparent from the following description taken in conjunction with the accompanying drawings wherein:

FIG. 2 is an enlarged side elevational view of the boom of FIG. 1 with the boom being shown in an extended condition, and illustrating in greater detail the cable compensating means of the invention;

FIG. 3 is a view generally similar to that of FIG. 2 but showing the boom in a retracted condition;

FIG. 4 is a top plan view of the FIG. 3 showing;

FIG. 5 is an enlarged, fragmentary, plan view of the outer boom section which is adapted to be received telescopically in the inner boom section, for varying the effective length of the boom, and showing in phantom lines the connection of the power means to the outer boom section which actuates the extension and retraction of the boom;

FIG. 6 is an enlarged cross-sectional view taken along the plane of line 6—6 of FIG. 5, looking in the direction of the arrows;

FIG. 7 is a reduced size, broken and partially sectioned view of the reciprocal motor unit which is adapted to be mounted on the outer boom section as shown in FIGS. 5 and 6, for selectively extending and retracting the boom;

FIG. 8 is an enlarged top plan view of the pulley block which coacts with the load cable system on the derrick, for automatically maintaining the load cable in selected position with respect to the boom, during extension and retraction of the boom;

FIG. 9 is a sectional view taken generally along the plane of 9—9 of FIG. 8, looking in the direction of the arrows;

FIG. 10 is a front end view of the head sheave assembly which is disposed at the outer end of the boom, for coaction with the load cable system of the derrick;

Figure 1:
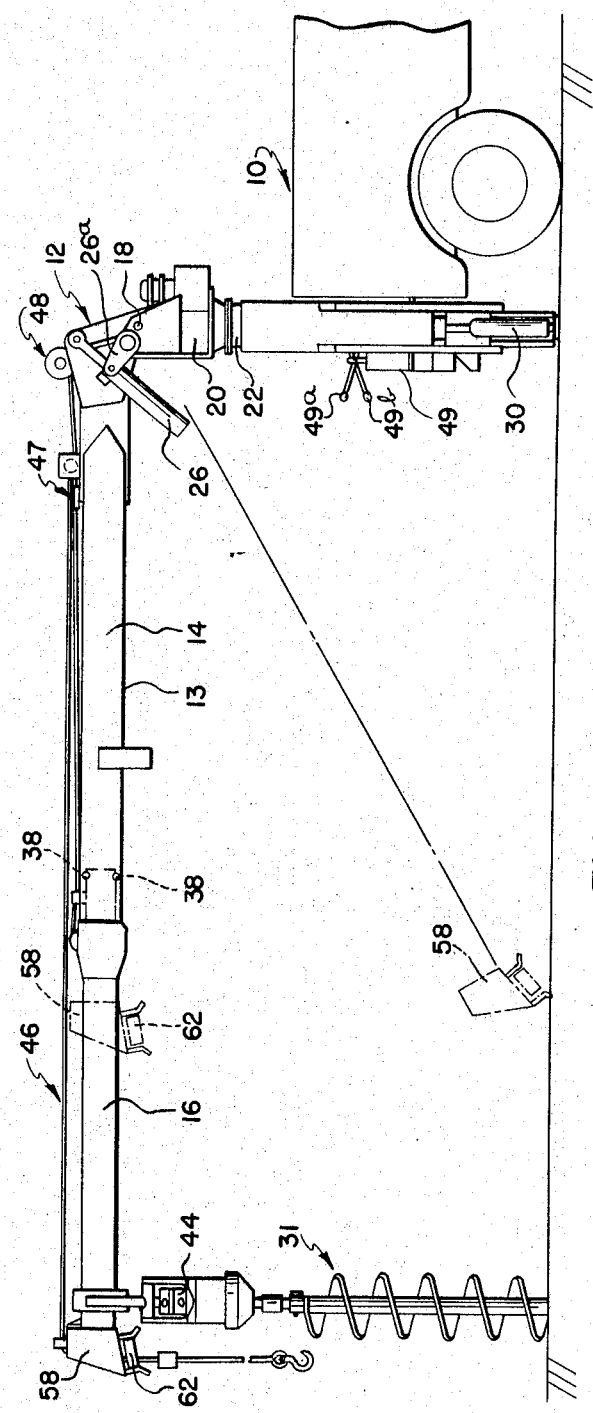
FIG. 1 is a fragmentary side elevational view of an extensible derrick boom having a load carrying cable system coacting therewith for handling a load, and including the automatic compensating means of the invention; a power driven earth boring auger is also illustrated as being supported by the boom.
Figure 12:
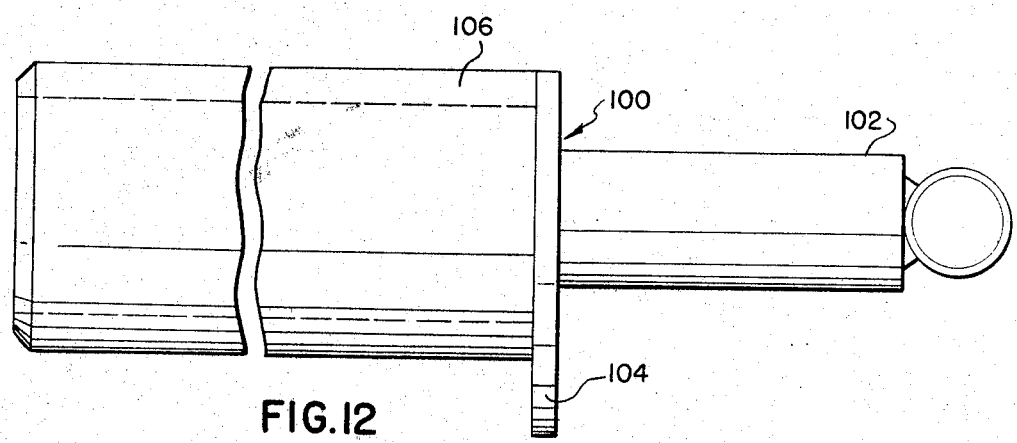
Figure 13:
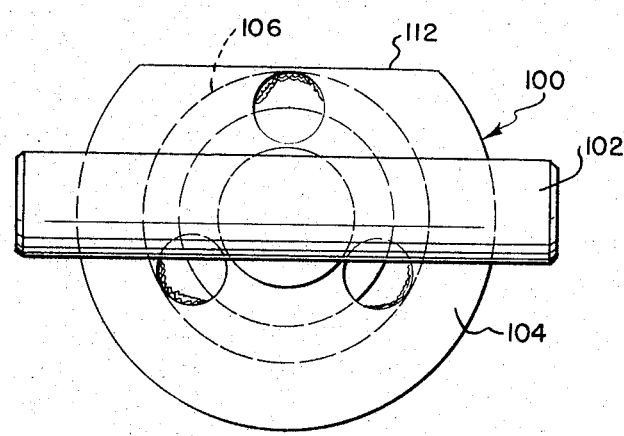
Figure 14:
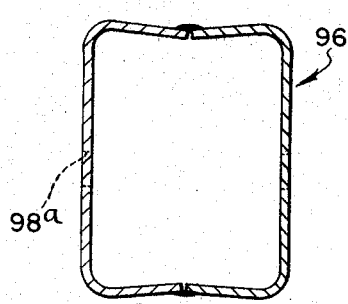

FIG. 11 is a fragmentary, enlarged, broken side elevational view of a modification of the invention for extending the effective length of the extensible or outer boom section and illustrating an auxiliary boom section which is selectively locked or attached to the outer boom section of FIGS. 1, 2, and 3, for extending the effective length of the boom; in phantom lines is illustrated the position of the head sheave assembly of such auxiliary boom section when the latter has been moved back into retracted condition in the outer boom section;

FIG. 12 is an enlarged side elevational, broken view of the pin used to lock the auxiliary extension boom section of FIG. 11 to the outer boom section of the boom;

FIG. 13 is an end elevational view of the locking pin taken from the right hand end of FIG. 12;

FIG. 14 is a transverse sectional view of the auxiliary boom extension taken generally along the plane of line 14—14 of FIG. 11;

FIG. 15 is an enlarged, fragmentary, elevational view showing the retaining means for maintaining the locking pin of FIGS. 12 and 13 in locking position;

FIG. 16 is a fragmetary view of the retaining means of FIG. 15 taken from the bottom thereof, which is adapted to maintain the locking pin (shown in phantom lines in FIG. 15) in position;

FIG. 17 is a fragmentary top plan view of the auxiliary boom section of FIG. 11 showing a work platform coupled thereto adjacent the outer end thereof.

Referring now again to the drawings, and in particular to FIG. 1, there is shown a fragmentary portion of a wheeled utility vehicle 10 having a truck body which carries a movable derrick or crane 12 thereon. The derrick boom 13 may embody an inner or lower generally hollow boom section 14, and an outer, generally hollow extendible boom section 16 which may be received in telescoping relation in the lower or inner section 14 of the boom. Outer boom section 16 may include reduced size end portion 16a (FIGS. 2 and 3) rigidly attached, as by welds, to the main portion of the boom section 16.

The boom, in the embodiment illustrated, is pivotally mounted, as at 18, to super structure 20, which in turn may be mounted on a pedestal 22 adapted for rotational movement about a generally vertical axis, for swinging the boom in a generally horizontal plane and which may be rotatable through 360°. Conventional power means may be provided for so swinging the derrick boom in a generally horizontal plane.

The boom being pivoted, as aforementioned, at 18 may be swung in a generally vertical plane with respect to the vehicle, and in this connection, it may be swung from a position below a horizontal plane passing through axis 18, to a position well above such horizontal plane. Fluid powered reciprocal motor means 26 and associated linkage 26a of known construction, may be provided for so swinging the boom in a generally vertical plane.

The boom may be mounted on a corner of the vehicle or it may be mounted any place on the vehicle body, and the vehicle may be provided with jack means 30 for aiding in stabilizing the vehicle during utilization of the derrick. In the embodiment illustrated, there is shown a power operated earth boring tool 31 mounted on the boom in a known manner for earth boring operations. Such earth boring tool may be adapted for coupling to either the inner boom section 14 or to the outer boom section 16 for extension and retraction with the outer boom section in a known manner. It will be understood however that the boom may or may not have such earth boring tool associated therewith.

Reciprocal fluid powered motor unit 32 (FIGS. 2, 3 and 7) may be provided, pivotally connected to the outer boom section 16 and pivotally connected as at 34 (FIG. 2) to the inner boom section, for selectively extending and retracting the boom. Such structural arrangement for connecting the receiprocal motor unit 32 to the outer boom section and to the inner boom section for extending and retracting the boom sections will be hereinafter described in greater detail.

Referring now to FIG. 5, the outer boom sections 16, which may be of a rectangular configuration in transverse cross-section, may embody roller means 38 thereon for facilitating anti-frictional movement of the outer boom section with respect to the inner boom section during extension and retraction of the boom. There also may be provided roller means 40 (FIGS. 2, 3 and 4) mounted on the inner boom section 14 adapted for rolling coaction with the outer boom section 16, for facilitating lengthwise movement of the outer boom section with respect to the inner boom section. The boom may carry telescoping fluid transmitting lines 42 (FIGS. 2, 3 and 4) which have been broken in the interests of clarity of illustration, for transmitting actuating fluid from a source of pressurized fluid disposed on the vehicle, outwardly along the boom and to for instance the motor unit 44 (FIG. 1) of the earth boring tool 31, for actuating the earth boring tool.

A load supporting cable means 46 is mounted on the boom for supporting a load, such as for instance a telephone pole, or other load, at the outer end of the boom, and automatic compensating means 47 (FIGS. 2, 3 and 4) is provided in association with the load supporting cable system 46 and in accordance with the invention, for maintaining a load at a selected level while the boom is being extended or retracted.

A preferably power operated winch mechanism 48, which may be of conventional fluid powered rotary type, is preferably mounted adjacent the proximal end of the boom, for coaction with the load supporting cable means 46 to selectively extend and retract the cable. In this connection, a conventional spool type distributing valve bank 49 having a plurality of control handles 49a, 49b may be mounted on the vehicle and coupled into the fluid power system in the conventional manner. Control handle 49a may control the application of pressurized fluid to the fluid motor 48a of winch mechanism 48, and control handle 49b may control the application of pressurized fluid to boom actuating motor unit 32.

The cable system 46 may comprise two sections A and B (FIGS. 2, 3 and 4) which sections coact between the inner boom section 14 and the outer boom section 16 for maintaining the cable means 46 in a selected position with respect to the boom during extension and retraction of the boom.

Cable section A may commence at the winch mechanism 48 and be reeved thereabout as best shown for instance in FIG. 4, and then extends outwardly along the boom to pass under an idler roller means 50 (FIG. 3) mounted on the inner boom section 15. From roller 50 the cable section A may extend outwardly and be reeved about rotatable generally horizontal pulley 52 (FIGS. 3, 8 and 9) of movable compensating pulley block 47. Cable section A then reverses its direction, extending back from rotatable pulley 52 and passes upwardly around pulley 56, which may be mounted on the inner boom section 14. From pulley 56 the cable section A may extend outwardly along the boom as shown in FIG. 3 to pass down through the sheave head 58 preferably removably attached as by bolts 59 (FIG. 10) to the outer end of portion 16a of outer boom section 16.

Sheave head 58 may comprise a pair of generally vertically spaced rotatable pulleys 60, 60a which receive the load cable 46 in anti-friction relationship. From pulley 60a, the load supporting cable or section A of the cable preferably passes between a pair of laterally spaced stabilizing roller means 62 mounted on the sheave head, and which guide the cable. The cable is preferably provided with a frictionally slidable or movable plumb weight 66 thereon which is adapted to maintain the cable system 46 generally taut at all times. The slidable relationship between the weight 66 and the cable enables the weight to be moved outwardly along the cable if the cable is retracted by means of winch mechanism 48 so that the weight engages the sheave head 58.

The other section B of the load cable 46 is anchored as at 68 to an anchoring lug on the top side of the inner boom section 14, and then is passed rearwardly around idler pulley 70 (FIGS. 3, 4 and 8) of compensating pulley block 47. From the pulley 70, the cable section B passes forwardly and preferably under a roller or other holder 72 mounted by means of bracket 72a on boom section 14, and then passes down around idler pulley 74 rotatably mounted on boom section 14. Cable section B then passes through a slot in the top wall of the inner boom section 14 underlying pulley 74 and passes rearwardly interiorly of boom section 14, and above the outer boom section 16, to be anchored as at 76 (FIGS. 2 and 5) to an anchoring lug on the top side of the outer boom section 16, generally adjacent its innermost end. Aforementioned roller means 38, 40 supports the outer boom section interiorly of the inner boom section 14 in anti-friction generally spaced relation, and in non-binding condition with respect to the interiorly disposed section B of the cable system.

As aforementioned, the reciprocal double acting, fluid powered motor unit 32 is connected as at 34 to the inner boom section 14 and is movably or pivotally connected as at 77 (FIG. 6) to the interior of the outer boom section 16. Connection 77 may comprise threaded members 80 adjustably or removably mounted on the outer boom section 16 and extending inwardly therefrom, and adapted to be received in openings 82 in collar portion 84 (FIGS. 6 and 7) of the motor unit 32. Distributing ports 86, 86a may be provided in one end of the motor unit and preferably in the end which is connected to the inner boom section 14, for egress and ingress of pressurized fluid, to actuate the piston 88 of the motor unit.

Operation of the mechanism preferably is as follows:

When the derrick or crane is in the position illustrated for instance in FIG. 3, with the outer boom section 16 retracted into the inner boom section 14, the motor unit 32 may be substantially in the condition illustrated in FIG. 7, or in other words, in a contracted condition. Application of pressurized fluid to for instance distributing port 86a will apply fluid pressure to the left hand end of the piston 88, and via passageway 90 in the motor unit, to thus cause outward movement of the cylinder 91 with respect to the piston and piston rod 91a of the motor unit, thereby causing outward movement of the outer boom section 16 with respect to the inner boom section 14.

As the outer boom section 16 moves outwardly, it would ordinarily move outwardly relative to section A of the load carrying means 46, but since section B of the cable means is moving outwardly with the boom section 16, the compensating pulley block 47 will move longitudinally rearwardly with respect to the boom and toward the position illustrated for instance in FIG. 2 of the drawings. FIG. 2 is an illustration showing the substantially maximum outward extension of the boom. Thus, a load, and for example the plumb weight 66 carried by the load carrying cable means, is actually maintained in substantially the same or a fixed position with respect to the outer end of the boom, and does not move or change its relative position upon retraction or extension of the boom. Actuation of the winch mechanism 48 as by means of its associated motor unit 48a, will of course move the cable means and thus a load supported by the cable means, relative to the end of the boom. Thus, during extension and retraction of the boom, only one control lever (i.e. 49b) the lever which controls the actuation of the double acting motor unit 32, need be operated by the operator, with the position of a load supported by the cable 46, being automatically compensated for by the compensating mechanism.

Referring now to FIGS. 11 through 14, there is shown a modified form of boom wherein the boom proper can be generally the same as that aforedescribed, including an inner boom section 14 (not shown) and an outer boom section 16, as before. However, the sheave head 58 has been removed from the outer end 95 of the outer end portion 16a of boom section 16, and in its place there is provided an extensible auxiliary boom section 96 which has a sheave head 58', which may be identical in construction to the sheave head 58 of the first described embodiment, connected to its outer end. The extendible auxiliary section 96 may be preferably manually moved outwardly with respect to the power operated outer boom section 16, and there is provided locking means 98 for maintaining the extendible, or movable auxiliary section 96 in a selected position with respect to boom section 16. When auxiliary section 96 is pulled out, the winch mechanism 48 may be actuated to pay out cable to increase the fixed length of the cable from the winch to the sheave head 58'. To retract auxiliary section 96, locking means 98 may be removed and then the winch may be actuated until weight 66, and associated hook (FIG. 1) engages the sheave head 58', and then further operation of the winch will retract section 96 into outer boom section 16, and to, for instance the position illustrated in dot-dash lines in FIG. 11. The trunnion mounted power unit 32 enables retraction of the hollow boom section 96 without interference with power unit 32.

In this connection, the auxiliary boom section 96 which may be of the generally rectangular configuration in cross-section, as shown in FIG. 14, may possess preferably a series of openings 98a through a side wall thereof, and the outer end portion 16a of boom section 16 of the power operated portion of the boom may also be provided with a series of openings 98b therethrough, through one of which openings is adapted to extend the locking pin member 100, shown in FIGS. 12 and 13.

The lock pin member 100 comprises a handle portion 102, a flange portion 104 connected to the handle portion, and a plunger portion 106, which is adapted to extend through the opening 98b in boom section 16 aligned with a section of the openings 98a in auxiliary boom section 96, and lock auxiliary boom section 96 in a predetermined position with respect to the powered boom section 16.

The inner end of auxiliary boom section 96 is preferably provided with wear plates 108 on the top, bottom and sides thereof, which are adapted to slidingly engage the inner surface of the hollow boom section 16 during manual adjusting of auxiliary section 96 with respect to boom section 16. In this connection, outer boom section 16, rearwardly of end portion 16a may be provided with an access opening 109 in each of the side and top and bottom walls thereof, for installing the wear plates 108 onto auxiliary boom section 96, and welding them as by plug welds 109a, in place. The wear plates may have openings therethrough for facilitating the plug welds 109a.

As shown in FIGS. 11 and 15, the pin lock 100 is adapted to be frictionally held in place by a bracket 110 (FIGS. 11, 15 and 16) which has an overlapping frictional coaction with the circular flange 104 on the pin lock 100, and with such flange having a cut away portion, as at 112, which when the pin is turned 180° by means of the handle 102, will permit withdrawal of the pin from locking coaction with the bracket 110 and with the boom sections, and thereby permit lengthwise movement of the manually extendible auxiliary section 96 of the boom, or complete removal of such auxiliary section 96 upon removal of the wear plates 108. Of course in order to use the boom and cable system after removal of the auxiliary section 96, a sheave head 58 should be attached to the outer end portion 16a of extendible boom section 16. In phantom lines in FIG. 11 there is shown the position of the sheave head 58' of auxiliary section 96 when it is moved or slid inwardly or rearwardly its maximum amount and locked in place by lock pin 100.

Auxiliary boom section 96 may also be provided with an opening 114 through the side walls thereof, rearwardly of sheave head 58', for receiving a shaft 116 (FIG. 17) therethrough. Shaft 116 may rotatably support a work platform 118, which may be of the well known bucket type, for carrying a workman on the outer end of the boom and locating such workman at any desired location within the range of movement of the derrick.

From the foregoing discussion and accompanying drawings it will be seen that applicant's arrangement provides a novel derrick or crane having an extensible boom and which eliminates the necessity for an operator to actuate both a winch mechanism and a mechanism for extending and retracting the extensible boom, at the same time, and provides automatic compensating means for maintaining the load at a given level while the boom is being retracted or extended, and eliminates the possibility of breaking of the cable and movement of the load relative to the boom while extension and retraction of the boom is occurring. The invention also provides a boom of the aforediscussed type, including a novel removable, extendible auxiliary section, for increasing the reach of the boom.

The terms and expressions which have been used are used as terms of description and not of limitation, and there is no intention in the use of such terms and descriptions of excluding any equivalents of any of the features shown and described, or portions thereof, and it is recognized that various modifications are possible within the scope of the invention claimed.

We claim:

1. An extensible derrick comprising, a support, a boom pivotally mounted on said support for pivotal movement in a generally vertical plane, means for actuating said boom in said generally vertical plane, means pivotally mounting said boom on said support for swinging movement in a generally horizontal plane, said boom comprising an inner boom section and an outer boom section adapted for lengthwise movement relative to said inner boom section, reciprocal fluid powered means disposed interiorly of said boom sections and coacting between said boom sections for extending and retracting said outer boom section relative to said inner boom section for selectively varying the effective length of the boom, a winch mechanism mounted on said inner boom section adjacent the pivotal connection thereof to said support, cable means coacting with said winch mechanism and extending along the boom and downwardly therefrom for supporting a load thereon, compensating means coacting between said inner and outer boom sections and the cable means for automatically maintaining the cable means at a selected level with respect to the boom during extension and retraction of the boom, said cable means comprising two cable sections, one of which cable sections coacts with said winch mechanism and extends outwardly over the distal end of the outer boom section, said winch mechanism being operative to move said one cable section relative to said boom, the other of said cable sections being attached to said outer boom section adjacent the inner end of said outer boom section and being attached to said inner boom section adjacent the distal end of said inner boom section, said compensating means including a coacting pulley block having horizontally disposed pulleys thereon coupling the cable sections together, said other cable section being disposed interiorly of said inner boom section and extending exteriorly thereof into coacting relationship with said pulley block, said pulley block being adapted to move lengthwise across the top surface of said boom during extension and retraction of the boom, for maintaining the outer end of the first mentioned cable section at a substantially constant level with respect to the boom.

2. A derrick in accordance with claim 1, including means coacting between said boom sections orienting said outer boom section in anti-frictional generally spaced relation interiorly of said inner boom section, and in nonbinding relation with respect to said other cable section, and weight means coacting with said one cable section for maintaining said cable means in generally taut condition.

3. An extensible boom assembly comprising, an inner boom section and an outer boom section adapted for lengthwise movement relative to one another, power means for moving one boom section lengthwise relative to the other boom section, said power means including a reciprocable, fluid pressure motor unit disposed interiorly of said boom sections, said motor unit being operably connected at one end to said inner boom section and being operably connected generally intermediate its ends to said outer boom section, cable means extending lengthwise along the boom assembly, means for actuating the cable means relative to the boom assembly, an auxiliary boom section coupled to said outer boom section and movable lengthwise with respect thereto for extending the effective length of said outer boom section, said cable means extending lengthwise along the boom assembly and downwardly from the distal end of said auxiliary boom section, for supporting a load thereon, and compensating means coacting between said inner and said outer boom sections and the cable means for automatically maintaining the cable means at a selected level with respect to the boom assembly during extension and retraction of the boom assembly.

4. An extensible derrick comprising, a boom assembly pivotally mounted on a support for swinging movement in a generally vertical plane, said boom assembly comprising an inner boom section and an outer boom section adapted for lengthwise movement relative to the inner boom section, fluid power operated means disposed interiorly of said boom sections for extending and retracting the outer boom section with respect to the inner boom section for selectively varying the effective length of the boom, said power means including a reciprocable, double-acting fluid pressure motor unit pivotally connected at one end to said inner boom section and pivotally connected generally intermediate its end to said outer boom section, an auxiliary boom section disposed in telescoping relation in said outer boom section, removable locking means locking said auxiliary boom section in predetermined position with respect to said outer boom section, said auxiliary boom section including a sheave head attached to its distal end, a winch mechanism mounted on said inner boom section adjacent the pivotal mounting of said boom assembly to said support, cable means coacting with said winch mechanism and extending along the boom assembly over said sheave head and downwardly therefrom for supporting a load thereon, and compensating means coacting between the inner and the outer boom sections and said cable means for automatically maintaining the cable means at a selected level with respect to the sheave head during extension and retraction of the boom assembly.

5. An extensible boom assembly comprising, a support, a boom pivotally mounted on said support for pivotal movement in a generally vertical plane, said boom including an inner boom section and an outer boom section adapted for extensible lengthwise movement relative to said inner boom section, power means disposed for coaction between said boom sections for extending and retracting said outer boom section relative to said inner boom section, cable means extending along the boom and downwardly therefrom for supporting a load adjacent one end thereof, actuating means for moving the cable means lengthwise of said boom, compensating means disposed for movement exteriorly of said boom and coacting between said inner and outer boom sections and said cable means for automatically maintaining said cable means at a selected level with respect to said boom during extension and retraction of said boom, said cable means comprising two cable sections, one cable section being operably connected at one end to said actuating means and extending outwardly along the boom and over the end of the outer boom section, said actuating means being operative to move said one cable section relative to said boom, the other cable section being attached at one end adjacent the outer end of said inner boom section and at its other end adjacent the inner end of said outer boom section, said compensating means including a coacting pulley block having a pair of laterally spaced, generally horizontally disposed pulleys thereon coupling said cable sections together, said one cable section coacting in reeved relation with the rearwardmost of one of said pulleys and the other cable section extending interiorly from its connection to said outer boom section and then exteriorly of said outer and inner boom sections and into coacting reeved relation with the forwardmost of said pulleys, and said pulley block being adapted to move lengthwise adjacent the outer surface of said boom during extension and retraction of said outer boom section for maintaining the outer end of said first mentioned cable section at a substantially constant level with respect to said boom.

6. A boom assembly in accordance with claim 5, wherein said actuating means includes a winch mechanism mounted on said inner boom section adjacent the pivotal connection thereof to said support.

7. In a boom assembly in accordance with claim 5, including a pair of lengthwise spaced, generally vertically disposed pulleys mounted on said inner boom section, said pulley block being movable between said vertically disposed pulleys lengthwise of said boom, and each of the pulleys of said vertical pair coacting in reeved relation with a respective one of said cable sections.

8. A boom assembly in accordance with claim 5, wherein said outer boom section includes a sheave head secured thereto and with said one cable section extending through and downwardly from said sheave head in anti-friction relation, and laterally spaced roller means mounted on said sheave head and coacting with said one cable section in guiding relation.

9. A boom assembly in accordance with claim 5, wherein said boom sections are substantially hollow with said outer boom section being received telescopingly within said inner boom section for lengthwise movement relative to said inner boom section, said power means including a reciprocable, double-acting fluid pressure motor unit disposed interiorly of said boom sections, said motor unit being pivotally connected at one end to said inner boom section and being pivotally connected generally intermediate its ends to said outer boom section.

10. A boom assembly in accordance with claim 9, including an auxiliary boom section disposed in telescoping relation in said outer boom section, locking means locking said auxiliary boom section in predetermined position relative to said outer boom section, and said auxiliary boom section including a sheave head for receiving in reeved coacting load supporting engagement said first mentioned cable section.

11. An extensible boom assembly comprising, an inner boom section and an outer boom section adapted for lengthwise movement relative to the inner boom section, actuating means for extending and retracting the outer boom section with respect to the inner boom section, said actuating means including a reciprocable fluid pressure motor unit disposed interiorly of said boom sections, said motor unit being operably connected adjacent one end to said inner boom section and being operably connected generally intermediate its ends to said outer boom section, a winch mechanism, cable means coacting with said winch mechanism and adapted to extend along the boom assembly and downwardly therefrom for supporting a load thereon, compensating means coacting between said inner and outer boom sections and said cable means, said cable means comprising a pair of cable sections, one of which coacts with said winch mechanism and extends outwardly over the distal end of the boom assembly, and the other of which is attached to the outer boom section adjacent the inner end of said outer boom section and to said inner boom section, said compensating means including coacting pulley means coupling the cable sections together, said pulley means being adapted to move lengthwise of the boom assembly upon extension and retraction of the boom assembly, to maintain the outer end of the first mentioned cable section at a substantially constant level with respect to the boom assembly, said pulley means comprising a pulley block having horizontally disposed pulleys mounted in lengthwise spaced relation with respect to one another, one of said cable sections coacting in reeved relation with the rearwardmost one of said horizontal pulleys, and the other of said cable sections coacting with the forwardmost one of the horizontal pulleys in reeved relation, said pulley block being disposed adjacent the top surface of said boom assembly, weight means coacting with said one cable section to maintain said cable means in taut condition, and a pair of lengthwise spaced, generally vertically disposed pulleys mounted on said inner boom section, each pulley of said vertical pair coacting with a respective one of said cable sections in reeved relation.

References Cited by the Examiner

UNITED STATES PATENTS

| | | | |
|---|---|---|---|
| 512,898 | 1/1894 | Pless | 212—144 |
| 2,919,036 | 12/1959 | Raymond | 212—55 X |
| 3,082,889 | 3/1963 | Bopp | 212—35 X |
| 3,125,227 | 3/1964 | Kauffman et al. | 212—144 |
| 3,154,025 | 10/1964 | Worthington | 212—55 X |

OTHER REFERENCES

St 8816 Germany, November 1956.

ANDRES H. NIELSEN, *Primary Examiner.*

SAMUEL F. COLEMAN, A. LEVINE,
*Assistant Examiners.*